United States Patent
Sacripante

(10) Patent No.: US 8,088,544 B2
(45) Date of Patent: Jan. 3, 2012

(54) CORE-SHELL POLYMER NANOPARTICLES AND METHOD OF MAKING EMULSION AGGREGATION PARTICLES USING SAME

(75) Inventor: Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 993 days.

(21) Appl. No.: 11/830,351

(22) Filed: Jul. 30, 2007

(65) Prior Publication Data
US 2009/0035686 A1 Feb. 5, 2009

(51) Int. Cl.
*G03G 9/093* (2006.01)

(52) U.S. Cl. .............. 430/110.2; 430/106.1; 430/108.8; 430/109.1; 430/109.4; 525/50; 525/55; 525/149; 106/31.25

(58) Field of Classification Search ............... 430/106.1, 430/108.8, 109.1, 109.4, 110.2; 525/50, 525/55, 149; 106/31.25
See application file for complete search history.

(56) References Cited

U.S. PATENT DOCUMENTS

| | | | |
|---|---|---|---|
| 3,590,000 A | 6/1971 | Palermiti et al. | |
| 3,655,374 A | 4/1972 | Palermiti et al. | |
| 3,720,617 A | 3/1973 | Chatterji et al. | |
| 3,944,493 A | 3/1976 | Jadwin et al. | |
| 3,983,045 A | 9/1976 | Jugle et al. | |
| 4,007,293 A | 2/1977 | Mincer et al. | |
| 4,079,014 A | 3/1978 | Burness et al. | |
| 4,394,430 A | 7/1983 | Jadwin et al. | |
| 4,560,635 A | 12/1985 | Hoffend et al. | |
| 5,604,076 A * | 2/1997 | Patel et al. | 430/137.14 |
| 5,763,130 A * | 6/1998 | Sasaki et al. | 430/110.2 |
| 5,858,601 A | 1/1999 | Ong et al. | |
| 2003/0215733 A1 * | 11/2003 | Cheng et al. | 430/137.14 |
| 2004/0101775 A1 * | 5/2004 | Mikuriya et al. | 430/108.4 |
| 2005/0048389 A1 | 3/2005 | Cheng et al. | |
| 2005/0159530 A1 | 7/2005 | Lee et al. | |
| 2005/0208414 A1 | 9/2005 | Nakamura et al. | |
| 2006/0088779 A1 | 4/2006 | Sacripante et al. | |
| 2006/0216626 A1 * | 9/2006 | Sacripante et al. | 430/109.4 |
| 2006/0275679 A1 * | 12/2006 | Ishiyama et al. | 430/42 |
| 2006/0292477 A1 | 12/2006 | Daimon et al. | |
| 2007/0020552 A1 | 1/2007 | Matsumoto et al. | |
| 2008/0210124 A1 | 9/2008 | Keoshkerian et al. | |
| 2009/0053644 A1 | 2/2009 | Sacripante | |

FOREIGN PATENT DOCUMENTS

| | | | |
|---|---|---|---|
| EP | 1 965 262 A | | 9/2008 |
| JP | 2005-055498 | * | 3/2005 |

OTHER PUBLICATIONS

Translation of JP 2005-055498 published Mar. 2005.*
Polymer Science Learning Center, Department of Polymer Science, "The Glass Transition", 2005, pp. 1-8.
Non-Final Rejection in U.S. Appl. No. 11/844,029, mailed Nov. 10, 2010.
Canadian Office Action issued Sep. 28, 2010 in Canadian Patent Application No. 2,638,695.
Office Action mailed Apr. 14, 2011 in U.S. Appl. No. 11/844,029.
Canadian Office Action issued Jun. 16, 2011 in Canadian Patent Application No. 2,638,695.
Notice of Allowance mailed Jul. 6, 2011 issued in U.S. Appl. No. 11/844,029.

* cited by examiner

*Primary Examiner* — Peter Vajda
(74) *Attorney, Agent, or Firm* — Oliff & Berridge, PLC

(57) ABSTRACT

Nano-sized particles for use in making emulsion aggregation toner particles have a core portion and a shell portion, wherein the core portion of the nano-sized particles includes crystalline resin and the shell portion includes amorphous resin and is substantially to completely free of the crystalline resin.

27 Claims, No Drawings

CORE-SHELL POLYMER NANOPARTICLES AND METHOD OF MAKING EMULSION AGGREGATION PARTICLES USING SAME

BACKGROUND

Disclosed herein are core-shell polymer nanoparticles and a method for making emulsion aggregation toner particles using these nano-sized particles. The core-shell polymer nanoparticles have a core portion that may comprise a crystalline component and a shell portion having an amorphous component, where the amorphous component and crystalline component are substantially incompatible.

The nano-sized core-shell particles may be used as starting particles in an emulsion aggregation process, and may be aggregated with another amorphous resin particle, which may be compatible with either or both the amorphous and crystalline resins of the core-shell nanoparticles, in generating emulsion aggregation toner particles.

The nano-sized particles are advantageous in permitting inclusion of greater amounts of crystalline materials, thereby lowering the minimum fixing temperature of the end toner particles.

REFERENCES

Toners having crystalline polyester resins or semi-crystalline resins that are employed in various image development systems are known. Current crystalline and semi-crystalline toners and development systems comprising such toners may have relative humidity (RH) sensitivity. It is desirable that developers be functional under all environmental conditions to enable good image quality from a printer. In other words, it is desirable for developers to function both at low humidity such as a 15% relative humidity (denoted herein as C-zone) and at high humidity such as at 85% relative humidity (denoted herein as A-zone).

Toner blends containing crystalline or semi-crystalline polyester resins with an amorphous resin have been recently shown to provide very desirable ultra-low melt fusing, which is a key enabler for high-speed printing and for lower fuser power consumption. These types of toners containing crystalline polyester have been demonstrated in both emulsion aggregation (hereinafter "EA") toners, and in conventional jetted toners. Potential issues with all toners containing crystalline or semi-crystalline polyester resins have been a low charge in A-zone and charge maintainability.

EA branched polyester toners containing crystalline polyesters show demonstrated ultra-low melt fusing performance, with very low minimum fixing temperature (MFT) and high gloss. However, charging performance, particularly in A-zone, may here again be an issue.

Present EA polyester based toner particles (hereinafter "EA polyester toner particles") are typically comprised of from about 5 to about 20% crystalline resin in an effort to balance lowering of melt fusing temperature (advantageous) with lowering of charge maintainability and RH sensitivity (disadvantageous). Poor charge maintainability and/or A-zone charge may be observed in the EA polyester toner particles having more than 15 to about 30% crystalline resin because of the low resistivity of the crystalline resin within the EA polyester toner particles. Thus, decreasing the minimum fixing temperature (hereinafter "MFT") (a lowest temperature at which the toner is fixed to the paper in a fusing subsystem) for the EA polyester toner particles by further increasing the amount of crystalline resin therein may cause the EA polyester toner particles to exhibit a decrease in charge maintainability and/or A-zone charge.

One solution has been to attempt to have a shell made from an amorphous resin placed upon the EA toner particle including crystalline resin in the core. As the shell of amorphous resin is grown around the crystalline resin containing core, a portion of the crystalline resin may migrate into the shell or to the surface of the EA polyester toner particles. Additionally, during coalescence of the toner particle, the crystalline component can diffuse or compatiblize with the shell resin. Thus, the toner particles may still have a surface that includes crystalline resin. As a result, the low resistivity of the crystalline resin that is present in the shell or at the surface of the EA polyester toner particles causes the EA polyester toner particles to possibly exhibit poor charge maintainability and/or A-zone charge as detailed above.

Thus, a need exists for better methods to incorporate crystalline material into toner particles while avoiding problems associated with the inclusion of such crystalline material.

SUMMARY

In embodiments, disclosed herein are core-shell nano-sized particles comprising particles having a core and a shell, wherein the core of the particles comprises crystalline material and the shell of the particles comprises amorphous material and is substantially to completely free of crystalline material, wherein the shell encapsulates the core, and wherein the particles have an average particle size of about 1 nm to about 250 nm. Furthermore, in embodiments, the crystalline core resin and the amorphous shell resin are substantially incompatible, such that when coalesced to make the EA toner, the crystalline component does not migrate, diffuse or compatiblize with the shell resin. In other words, the crystalline resin remains substantially in the core portion of the EA toner.

In further embodiments, disclosed is a method for making emulsion aggregation toner particles including providing nano-sized particles having a core portion that comprises crystalline material and a shell portion that comprises amorphous material and is substantially to completely free of crystalline material, wherein the shell portion of the nano-sized particles encapsulates the core portion of the nano-sized particles, and wherein the particles have an average particle size of about 1 nm to about 250 nm. Moreover, the method includes aggregating an emulsion of the nano-sized particles disclosed herein with a second amorphous resin, which may be compatible with both the amorphous and crystalline components of the nano-sized shell-core resin particles. Moreover, the method includes the coalescence of the aggregated nanoparticles to form toner particles.

In yet further embodiments, disclosed is an emulsion aggregation toner particle comprising a core, wherein the core is aggregated from nanoparticles having a nanoparticle core and a nanoparticle shell, wherein the nanoparticle core of the nanoparticles comprises crystalline material and the nanoparticle shell of the nanoparticles comprises amorphous material and is substantially to completely free of crystalline material, wherein the nanoparticle shell encapsulates the nanoparticle core, and wherein the nanoparticles have an average particle size of about 1 nm to about 250 nm. Moreover, the emulsion aggregation toner particle includes a shell that encapsulates the aggregated core, wherein the nanoparticle shell is substantially free of the crystalline material. In yet further embodiments, the crystalline resin and amorphous resin of the core-shell nanoparticles are substantially incompatible, and the toner aggregate further comprises secondary amorphous nanoparticles which are compatible with the core and the shell of the core-shell nanoparticles.

EMBODIMENTS

Disclosed herein are core-shell structure nano-sized particles having a core/shell structure with a core that may include crystalline material (hereinafter "crystalline resin") and a shell that may include amorphous material (hereinafter "amorphous resin"), the shell being substantially free or completely free of crystalline resin. The nano-sized particles may have aggregation/coalescence functionality and may exhibit ultra low melt properties. The nano-sized particles may be utilized as starting seed materials in forming emulsion aggregation (EA) toner particles. The nano-sized particles may be mixed with another amorphous resin emulsion in forming the emulsion aggregation toner particles. A still further amorphous resin may be utilized to form a shell over an aggregated core portion formed from the crystalline core/amorphous shell nanoparticle emulsion and the amorphous resin emulsion. Forming a shell over such aggregated particles made from the nano-sized particles may act as yet another barrier to migration of the crystalline resin in the cores of the nano-sized particles to the surface of the EA toner particles. Such permits greater amounts of crystalline resin to be present in the end aggregated particles while avoiding the charging issues discussed above.

The term "nano-sized" or "nanoparticle" refers to, for example, average particle sizes of from about 1 nm to about 250 nm. For example, the nano-sized particles may have a size of from about 1 nm to about 150 nm, from about 5 nm to about 150 nm, from about 5 nm to about 100 nm or from about 5 nm to about 75 nm.

The core portion of the core-shell nano-sized particles described herein may comprise from about 20 weight percent to about 90 weight percent, such as from about 20 weight percent to about 40 weight percent, by weight of the core-shell nanoparticle. The shell portion of the nano-sized particles described herein may be from about 10 weight percent to about 80 weight percent, such as from about 60 to about 80 weight percent, by weight of the core-shell nanoparticle. The core-shell nanoparticle described herein may comprise from about 30 to about 100 percent by weight of the toner, such as from about 30 to about 70 percent by weight of the toner. The second amorphous resin nanoparticle may comprise from about 0 to about 70 percent by weight of the toner.

The core portion of the nano-sized particles may be comprised entirely of crystalline resin. Examples of suitable polymers that can be used for forming the core of the nano-sized particles include, but are not limited to, crystalline resins such as crystalline polyester, such as polyamides, polyimides, polyketones, or polyolefin resins, or semi-crystalline polyester, such as polyamides, polyimides, polyolefins or polyketone resins.

Illustrative examples of crystalline polyester-based polymers selected for the process in the core portion of the nano-sized particles of the present disclosure may include any of the various polyesters, such as poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene-fumarate), copoly-(butylene-fumarate)-copoly-(hexylene-fumarate), copoly-(ethylene-dodecanoate)-copoly-(ethylene-fumarate), mixtures thereof, and the like.

Other examples of crystalline materials selected for the core of the nano-sized particles disclosed herein may include waxes or polyolefins, such as polyethylene, polypropylene, polypentene, polydecene, polydodecene, polytetradecene, polyhexadecene, polyoctadene, and polycyclodecene, polyolefin copolymers, mixtures of polyolefins, bi-modal molecular weight polyolefins, functional polyolefins, acidic polyolefins, hydroxyl polyolefins, branched polyolefins, for example, such as those available from Sanyo Chemicals of Japan as VISCOL 550P™ and VISCOL 660P™, Mitsui "Hi-wax" NP055 and NP105, or wax blends such as MicroPowders, Micropro-440 and 440w. In embodiments, the crystalline polyolefin may be maleated olefins, such as CERAMER (Baker Hughes).

The crystalline resin may be derived from monomers selected from, for example, organic diols and diacids in the presence of a polycondensation catalyst.

The crystalline resin may be, for example, present in an amount of from about 5 to about 50 percent by weight of the toner, such as from about 5 to about 30 percent by weight of the toner.

The crystalline resin can possess a melting point of, for example, from at least about 60° C. (degrees Centigrade throughout), or for example, from about 70° C. to about 80° C., and a number average molecular weight ($M_n$), as measured by gel permeation chromatography (GPC) of, for example, from about 1,000 to about 50,000, or from about 2,000 to about 25,000, with a weight average molecular weight ($M_w$) of, for example, from about 2,000 to about 100,000, or from about 3,000 to about 80,000, as determined by GPC using polystyrene standards. The molecular weight distribution ($M_w/M_n$) of the crystalline resin is, for example, from about 2 to about 6, and more specifically, from about 2 to about 4.

The crystalline resin may be prepared by a polycondensation process involving reacting an organic diol and an organic diacid in the presence of a polycondensation catalyst. Generally, a stochiometric equimolar ratio of organic diol and organic diacid is utilized. However, in some instances wherein the boiling point of the organic diol is from about 180° C. to about 230° C., an excess amount of diol can be utilized and removed during the polycondensation process. Additional amounts of acid may be used to obtain a high acid number for the resin, for example an excess of diacid monomer or anhydride may be used. The amount of catalyst utilized varies, and can be selected in an amount, for example, of from about 0.01 to about 1 mole percent of the resin. Additionally, in place of an organic diacid, an organic diester can also be selected, and where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like. The aliphatic diol is, for example, selected in an amount of from about 45 to about 50 mole percent of the crystalline resin, or in an amount of from about 1 to about 10 mole percent of the polyester resin.

Examples of organic diacids or diesters selected for the preparation of the crystalline resins include oxalic acid, fumaric, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, and a diester or anhydride thereof.

Polycondensation catalyst examples for the preparation crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

Without a shell masking the functional groups of the core portion, the formed nano-sized particles may exhibit a low resistivity and thus may perform poorly in humid environments when utilized in toner formulations. Thus, the shell portion described herein enables the nano-sized particles to have a suitable resistivity, thereby forming the nano-sized particles suitable for use in EA toner formation processes.

In embodiments, suitable amorphous resins that may be used as the shell of the core-shell nanoparticle may include linear amorphous resins or branched amorphous resin.

Illustrative examples of the amorphous polyester may be, for example, poly(1,2-propylene-diethylene)terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), mixtures thereof, or the like. The amorphous polyester resin may also be crosslinked or branched to, for example, assist in the achievement of a broad fusing latitude, or when black or matte prints are desired.

The amorphous linear or branched polyester resins, which are available from a number of sources, are generally prepared by the polycondensation of an organic diol, a diacid or diester, and a multivalent polyacid or polyol as the branching agent and a polycondensation catalyst.

Examples of diacid or diesters selected for the preparation of amorphous polyesters include dicarboxylic acids or diesters selected from the group consisting of terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, in an amount of from about 45 to about 52 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected can vary, and more specifically, is, for example, from about 45 to about 52 mole percent of the amorphous polyester resin.

Branching agents to generate a branched amorphous polyester resin include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, 1,2,7,8-octanetetracarboxylic acid, and acid anhydrides thereof, and lower alkyl esters thereof; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxylmethyl benzene, mixtures thereof, and the like. The branching agent amount selected is, for example, from about 0.1 to about 5 mole percent of the resin.

The amorphous resin may be, for example, present in an amount of from about 50 to about 90 percent by weight, and, for example, from about 65 to about 85 percent by weight of the toner, which resin may be a branched or linear amorphous polyester resin where amorphous resin can possess, for example, a number average molecular weight ($M_n$), as measured by gel permeation chromatography (GPC), of from about 10,000 to about 500,000, and more specifically, for example, from about 5,000 to about 250,000, a weight average molecular weight ($M_w$) of, for example, from about 20,000 to about 600,000, and more specifically, for example, from about 7,000 to about 300,000, as determined by GPC using polystyrene standards; and wherein the molecular weight distribution ($M_w/M_n$) is, for example, from about 1.5 to about 6, and more specifically, from about 2 to about 4.

Other examples of amorphous resins that are not amorphous polyester resins that may be utilized herein include poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene-β-carboxyethyl acrylate), poly(styrene-butadiene-acrylonitrile-β-carboxyethyl acrylate), poly(styrene-butyl acrylate-β-carboxyethyl acrylate), poly(styrene-butyl acrylate-acrylononitrile-β-carboxyethyl acrylate), mixtures thereof, and the like. Such an amorphous resin may possess a weight average molecular weight Mw of, for example, from about 20,000 to about 55,000, and more specifically, from about 25,000 to about 45,000, a number average molecular weight Mn of, for example, from about 5,000 to about 18,000, and more specifically, from about 6,000 to about 15,000.

Mixtures of two or more of the above polymers may also be used, if desired.

The crystalline resin may be a polymer that may be the same as, similar to or different than a polymer of the amorphous resin. In an embodiment, the crystalline resin and the amorphous resin are both polyester resins.

Selection of specific amorphous resin may be conducted, for example, to provide desired polymer particle properties, structure, or the like. In embodiments, any suitable amorphous resin may be selected. Desirably, the amorphous resin is not miscible with the crystalline resin of the core portion. The amorphous resin may not be miscible with the crystalline resin of the core portion so that the amorphous resin does not penetrate the core and does not polymerize anywhere in the core portion of the nano-sized particle. Instead, the amorphous resin may be located on the surface of the core and may provide the desired core-shell structure of the nano-sized particles. The nano-sized particles may have the shell of amorphous resin that insulates the core portion of crystalline resin from the surface of the nano-sized particles. As a result, the shell of amorphous resin may prevent the crystalline resin from migrating to or moving to the shell or the surface of the shell of the nano-sized particles. In other words, the amorphous resin may encapsulate the crystalline resin to avoid diffusion of the crystalline component to the surface of the shell of the nano-sized particles.

Furthermore, the amorphous resin that may not be miscible with the core portion may be used to design particle nano-sized morphology. In embodiments, immiscible amorphous resins may exhibit phase separation from the newly formed polymer. In embodiments, the core-shell location will be affected by the hydrophilicity of the amorphous resin and the crystalline resin. Thus, crystalline resin may not be located within the shell or at the surface of the shell of the nano-sized particles.

In embodiments, the core-shell nanoparticles are comprised of a crystalline resin and an amorphous resin which are substantially not compatible. Examples of suitable combinations of a crystalline resin and an amorphous resin for the core-shell nanoparticles are crystalline polyesters for the core portion derived from high carbon atom diols, such as from about 9 carbon atom to about 12 carbon atom diols or from about 10 carbon atom to about 12 carbon atom diacids. Specific examples of such high carbon atom diols include poly-(1-9-nonylene-1,12-dodecanoate), poly-(1-10 decylene-1,12-dodecanoate), poly-(1,9-nonylene azaelate), poly-(1-10 decylene-1,12-dodecanoate), and suitable examples of the amorphous resin for the shell portion of the core-shell nano particles may be derived from alkoxylated bisphenol-A and fumaric acid such as poly(propoxylated bisphenol co-fumarate), poly(co-propoxylated bisphenol co-ethoxylated bisphenol fumarate), and the like. The above mentioned crystalline resins and amorphous resins are known not to be compatible or miscible with each other.

In addition to the nano-sized particles having the core-shell structure, the starting binder resin of the EA toner particles may include additional binder particles, for example comprised of additional amorphous resin, and desirably free of additional crystalline resin, and may also have an average particle size within the nanometer size range. The amorphous resin of the additional binder particles may include nano-sized amorphous based polymer particles, and may be compatible or miscible with the core-shell nanoparticles, such as being compatible with both the amorphous shell component and crystalline core component when elevated to the fusing temperature of the toner, such as, for example, from about 100° C. to about 130° C. The aforementioned amorphous resin of the additional binder may be a more hydrophobic resin derived from alkoxylated bisphenol-A, and a mixture of diacid in which at least a component of the diacid is hydrophobic such as dodecylsuccinic acid or anhydride. In embodiments, the amorphous resin is copoly(propoxylated-ethoxylated bisphenol-A-fumarate) copoly(propoxylated-ethoxylated bisphenol-co-dodecylsuccinate)m, and the like. This second amorphous resin nanoparticle may comprise of from about 0 to about 70 percent by weight of the starting binder resin of the EA toner particles, such as from 10 to about 65 percent by weight of the starting binder resin of the EA toner particles or from about 20 to about 60 percent by weight starting binder resin of the EA toner particles.

The amorphous resin of the additional binder particles may be the same as, similar to or different than the amorphous resin used to form the shell of the nano-sized particles having the core-shell structure. For example, a glass transition temperature (herein "Tg"), a molecular weight and/or hydrophobic properties of the amorphous resin of the additional binder particles may be the same as, similar to or different than a Tg, a molecular weight and/or hydrophobic properties of the amorphous resin used to form the shell of the core-shell structure nano-sized particles.

The nano-sized particles having the core-shell structure may be prepared by any suitable process, such as, coacervation, or phase inversion emulsification and the like. The process for preparing the core-shell structure may be a multiple step process which includes a step of forming the core portion and a step of subsequently forming the shell portion over the core portion to substantially completely to completely encapsulate the core portion with the shell portion. Such techniques are known in the art, such as microencapsulation or coacervation. As a result, the process for preparing the nano-sized particles may form nano-sized particles having a size within the nanometer size range. It should be understood that the core-shell structure of the nano-sized particles may be formed by any suitable process. Additionally, the present disclosure should not be deemed as limited to any specific process for forming the core-shell structure nano-sized particles.

For instance, a phase inversion process is well known, and can be utilized to generate a crystalline nanoparticle, comprising the steps of dissolving the crystalline resin in an organic solvent such as methylethyl ketone and inversion agent such as isopropanol, followed by the addition of a base such as ammonium hydroxide, and followed by the dropwise addition of water to form a suspension of nanoparticles in water, and followed by removing the organic solvent by distillation. The resulting crystalline nanoparticles can serve as the base core, and whereby the amorphous shell can be added through coacervation technique to encapsulate the crystalline core to form the core-shell nanoparticles. The coacervation process, is well known and comprises the steps of dissolving the amorphous resin (or encapsulating material) in an organic solvent miscible with water, such as acetone. The dissolved resin is then added dropwise to the above aqueous suspension of the core crystalline resin nanoparticles suspension which may also contain a surfactant. The amorphous resin would then be deposited on the core particles generating a core-shell nanoparticle.

Furthermore, the core-shell nanoparticle may be directly obtained through the phase inversion process, comprising the steps of dissolving both the crystalline and amorphous resin in a suitable organic solvent such as methylethyl ketone and inversion agent isopropanol, followed by the addition of a base such as ammonium hydroxide, and followed by the dropwise addition of water to form a suspension of nanoparticles in water, and followed by removing the organic solvent by distillation. This process will generate the core-shell morphology only if the crystalline and amorphous resins are not compatible (phase separate) and the polarity of both resins are substantially different such that one resin phase is attracted more by the oil, and the other resin is attracted more by the water in the oil-water phase.

The above processes may be used, for example, to prepare nano-sized core-shell polymer particles in a latex process, and on a scale that can be used for commercial purposes. In particular, in embodiments, the processes can be used to prepare core-shell polymer particles having average particle sizes in the nanometer size range. Specifically, the core-shell nano-sized particles may have an average particle size from about 1 nm to about 250 nm, from about 5 nm to about 150 nm, from about 5 nm to about 100 nm or from about 5 nm to about 75 nm.

The nano-sized particles find utility as starting particles in making an EA particle, such as an EA toner particle. Thus, in embodiments, the nano-sized particles may be used in an EA process to form EA toner particles having an optional colorant. The generated nano-sized particles may be incorporated into the EA toner process as a starting binder material of the EA toner particles. In such embodiments, a colorant may be optionally added during the EA process and may be found throughout the formed EA toner particles.

In addition to the nano-sized particles having the core-shell structure, the starting binder resin of the EA toner particles may include additional binder particles, for example comprised of additional amorphous resin, and desirably free of additional crystalline resin, and may also have an average particle size within the nanometer size range. The amorphous resin of the additional binder particles may include nano-sized amorphous based polymer particles. The amorphous resin of the additional binder particles may be compatible or miscible with the core-shell nanoparticles. In embodiments, the amorphous resins may be compatible or miscible with both the amorphous shell component and crystalline core component when elevated to a fusing temperature of the toner, such as from about 100° C. to about 130° C. The core-shell nano-sized particles and the additional binder particles may be mixed in an emulsion and used in forming a primary aggregate for making the EA toner particles.

As explained above, the shell portion of the core-shell nano-sized particles described herein may be from about 10 weight percent to about 80 weight percent, such as from about 60 to about 80 percent by weight of the core-shell nanoparticle. The core-shell nanoparticle described herein may comprise of from about 30 to about 100 percent by weight of the toner, such from about 30 to about 70 percent by weight of the toner. A second amorphous resin nanoparticle may comprise of from about 0 to about 70 percent by weight of the toner.

A colorant dispersion may be added into the starting emulsion of binder material for the EA process. As used herein, colorant may include pigment, dye, mixtures of dyes, mixtures of pigments, mixtures of dyes and pigments, and the like. The colorant may be present in an amount of from about 2 weight percent to about 18 weight percent, such as from about 3 weight percent to about 15 weight percent or from about 4 weight percent to about 13 weight percent, of the particle or EA toner particle as described herein.

Suitable example colorants may include, for example, carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments may include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like.

Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants may be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF). PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

In embodiments, in addition to the colorants, the EA toner particles may include other components such as waxes, curing agents, charge additives, and surface additives.

Examples of waxes may include functionalized waxes, polypropylenes and polyethylenes commercially available from Allied Chemical and Petrolite Corporation, wax emulsions available from Michaelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. Commercially available polyethylenes usually may possess a molecular weight of from about 1,000 to about 1,500, while the commercially available polypropylenes are believed to have a molecular weight of from about 4,000 to about 5,000. Examples functionalized waxes may include amines, amides, imides, esters, quaternary amines, carboxylic acids or acrylic polymer emulsion, for example JONCRYL, 74, 89, 130, 537, and 538, all available from SC Johnson Wax, and chlorinated polypropylenes and polyethylenes commercially available from Allied Chemical, Petrolite Corporation and SC Johnson Wax. When utilized, the wax may be present in the dye complex in an amount from about 2 weight percent to about 20 weight percent, such as from about 3 weight percent to about 15 weight percent or from about 4 weight percent to about 12 weight percent, of the toner.

The toner may also include known charge additives in effective amounts of, for example, from 0.1 to 5 weight percent, such as alkyl pyridinium halides, bisulfates, the charge control additives of U.S. Pat. Nos. 3,944,493, 4,007,293, 4,079,014, 4,394,430 and 4,560,635, which illustrate a toner with a distearyl dimethyl ammonium methyl sulfate charge additive, the disclosures of which are totally incorporated herein by reference, negative charge enhancing additives like aluminum complexes, and the like.

Surface additives that may be added to the EA toner particles after washing or drying include, for example, metal salts, metal salts of fatty acids, colloidal silicas, metal oxides like titanium, tin and the like, mixtures thereof and the like, which additives may usually be present in an amount of from about 0.1 to about 2 weight percent, reference U.S. Pat. Nos. 3,590,000, 3,720,617, 3,655,374 and 3,983,045, the disclosures of which are totally incorporated herein by reference. Additives may include, for example, titania and flow aids, such as fumed silicas like AEROSIL R972® available from Degussa Chemicals, or silicas available from Cabot Corporation or Degussa Chemicals, each in amounts of from about 0.1 to about 2 percent, which can be added during the aggregation process or blended into the formed toner product.

In one EA toner preparation, when the core-shell structure nano-sized particles are used as the starter binder resin, an emulsion of the nano-sized particles is transferred into a glass resin kettle equipped with a thermal probe and mechanical stirrer. Additional amorphous based binder nanoparticles may be added to the emulsion of the nano-sized particles while stirring. The colorant may also be optionally added to the emulsion of the nano-sized particles while stirring. Additionally, a wax dispersion, comprised of waxes as discussed further below, or additional additives may optionally be added. The emulsion of the core-shell structure nano-sized particles, the amorphous based binder particles, the optional colorant, the optional wax dispersion, and/or optional other additives, is subject to aggregation to form a core or primary aggregate having a size of from, for example, about 3 microns to about 15 microns or from about 3 microns to about 10 microns.

An optional dilute solution of flocculates or aggregating agents may be used to optimize particle aggregation time with as little fouling and coarse particle formation as possible. Examples of flocculates or aggregating agents may include polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quatemized polyoxyethylalkylamines, dodecylbenzyl triethyl ammonium chloride, MIRAPOL™ and ALKAQUAT™ (available from Alkaril Chemical Company), SANIZOL™ (benzalkonium chloride) (available from Kao Chemicals), and the like, and mixtures thereof.

In embodiments, the flocculates or aggregating agents may be used in an amount of from about 0.01 weight percent to about 10 weight percent of the toner, such as from about 0.02 weight percent to about 5 weight percent or from about 0.05 weight percent to about 2 weight percent. For example, the latitude of flocculates or aggregating agents around about a centerline particle formulation is about 0.17 weight percent±about 0.02 weight percent based upon the total weight of the toner.

Examples of coagulants that can act as aggregation agents can be selected for the processes of from, for example, aluminum sulfate, magnesium sulfate, zinc sulfate, potassium aluminum sulfate, calcium acetate, calcium chloride, calcium nitrate, zinc acetate, zinc nitrate, aluminum chloride. The coagulant may be contained in an aqueous medium in an amount of from, for example, 0.05 to 10 weight percent by weight, such as in the range of about 0.075 to about 2 weight percent by weight of toner. The coagulant may also contain minor amounts of other components such as for example, nitric acid.

Optionally, a shell may be added upon the primary aggregates. Such may be done by adding additional emulsion containing at least binder for the shell to the aggregated core mixture, and continuing with further aggregation to deposit the shell binder upon the aggregated core. The shell binder for the EA toner particles comprises at least an amorphous resin. The shell binder may be substantially free to free of crystalline resin. The amorphous resin of the shell particles may be the same as, similar to or different than the amorphous resin of the additional amorphous resin binder and/or of the shell of the nano-sized particles having the core-shell structure. A glass transition temperature (herein "Tg"), a molecular weight and/or hydrophobic properties of the amorphous resin of the shell particles may be the same as, similar to or different than a Tg, a molecular weight and/or hydrophobic properties of the additional amorphous resin binder and/or of the shell of the core-shell structure nano-sized particles.

The amorphous resin shell of the nano-sized particles, the additional amorphous resin binder of the core of the EA toner particles, and the amorphous resin shell of the EA toner particles may combine to prevent the crystalline resin of the core portion of the nano-sized particles from migrating into the shell of the EA toner particles or to the surface of the EA toner particles. As a result, the EA toner particles may have a surface that is substantially free to completely free of crystalline resin because the crystalline resin of the nano-sized particles encapsulated therein by the amorphous resin of the nano-sized particles.

The EA toner particles formed of the nano-sized particles may comprise from about 5 to about 50 weight percent crystalline resin, such as from about 5 to about 35 weight percent or from about 10 to about 30 weight percent crystalline resin. The size of the toner particles formed of the nano-sized particles may be from about 3 μm to about 15 μm, such as from about 5 μm to about 7 μm.

The minimum fixing temperature of the EA toner particles formed of the nano-sized particles may be from about 90° C. to about 140° C., such as from about 95° C. to about 130° C. or from about 100° C. to about 120° C. The RH sensitivity of EA toner particles formed of the nano-sized particles may be from about 0.5 to about 1.0.

The end aggregated particles, still in the mixture for the EA toner particles, may be stirred and heated, for example using an external water bath to a desired temperature, for example from about 40° C. to about 90° C., such as from about 65° C. to about 85° C., at a rate of from about 0.25° C./min. to about 2° C./min., to effect coalescence, that is, shaping, of the aggregation particles, for example to render the particles more circular.

The coalescence temperature of the reaction may be above the Tg of the amorphous resins that are used to form the shell particles of the EA toner particles, the binder particles of the EA toner particles and/or the shell of the core-shell structure nano-sized particles. Further, the coalescence temperature of the reaction may be less than a melting point temperature of the crystalline resin used to form the core portion of the core-shell stricture nano-sized particles. The mixture may then quenched with deionized water that may be at a temperature of, for example, from about 29° C. to about 45° C., such as from about 32° C. to about 45° C. or from about 29° C. to about 41° C. The slurry may then be washed and dried.

The toner particles may then be optionally subjected to further processing, for example, such as wet sieving, washing by filtration, and/or drying. The slurry may then be washed to remove impurities. The washing may involve base addition, addition of an optional enzyme product and mixing for several hours. The toner particles may then be filtered to a wet cake, re-slurred with de-ionized water and mixed. After mixing, the slurry may be dewatered, added to deionized water, pH adjusted and mixed.

Once the desired size of aggregated toner particles is achieved, the pH of the mixture is adjusted in order to inhibit further toner aggregation. The toner particles are further heated to a temperature of, for example, about 70° C. and the pH lowered in order to enable the particles to coalesce and spherodize. The heater is then turned off and the reactor mixture allowed to cool to room temperature, at which point the aggregated and coalesced toner particles are recovered and optionally washed and dried.

Having a surface substantially free to free of crystalline resin, the toner particles may exhibit ultra low melt properties, such as, more than about 20° C. to more than about 60° C. below the MFT for conventional polyester toner particles without the core-shell structure nano-sized particles. By avoiding crystalline resin at the surface of the EA toner particles, the EA toner particles may exhibit the ultra low melt properties without exhibiting poor charge maintainability or poor A-zone charge due to the low resistivity of crystalline resin at the surface of the EA toner particles. The EA toner particles may exhibit a resistivity of about at least $1 \times 10^{11}$ ohm-cm or greater than about $1 \times 10^{11}$ ohm-cm. Thus, the EA toner particles may exhibit high resistivity. As a result, the EA toner particles achieve excellent low melt properties without poor charge maintainability or poor A-zone charge by insulating the crystalline resin of the core portion of the nano-sized particles with amorphous based binder particles and amorphous based shell of the EA toner particles.

EXAMPLES

Example I

Preparation of Amorphous polyester Resin Nano-Particles Comprised of poly(propoxylated bisphenol co-fumarate), by Phase Inversion Process To a 1 liter container, equipped with an oil bath, distillation apparatus and mechanical stirrer, was added about 200 grams of an amorphous resin, poly(propoxylated bisphenol co-fumarate), obtained from Kao Corporation, and exhibiting a glass transition temperature of about 56.7° C., an acid value of about 16.8 and a softening point of about 109° C. To the resin was added about 125 grams of methyl ethyl ketone and about 15 grams of isopropanol. The mixture was stirred at about 350 revolution per minute (rpm), heated to about 45° C. over about a 30 minute period, and maintained at about 45° C. for about an additional 3 hours, whereby the resin dissolved to obtain a clear solution. To this solution, was then added dropwise, about 10.2 grams of ammonium hydroxide over about a two minute period, and after stirring for about an additional 10 minutes at about 350 rpm, about 600 grams of water was added dropwise at a rate of about 4.3 grams per minute utilizing a pump. After the addition of water, the organic solvent was removed by distillation at about 84° C., and the mixture was then cooled to about room temperature (about 20° C. to about 25° C.) to yield about 35% solids loading of an aqueous emulsion of amorphous nanoparticles with an average size of about 180 nanometers.

Example II

Preparation of a Core-Shell Nanoparticle Comprised of About 80 Percent by Weight of Crystalline Resin, poly-(1,9-nonylene-1,12-dodecanoate) as the Core, and About 20 Percent by Weight of Amorphous Resin, copoly(propoxylated-ethoxylated bisphenol-A-fumarate) copoly(propoxylated-ethoxylated bisphenol-co-dodecylsuccinate), as the Shell To a 1 liter kettle, equipped with an oil bath, distillation apparatus and mechanical stirrer, are added about 100 grams of copoly(propoxylated-ethoxylated bisphenol-A-fumarate) copoly(propoxylated-ethoxylated bisphenol-co-dodecylsuccinate), obtained from Kao Corporation, and exhibiting a glass transition temperature of about 59° C., acid value of about 14 and a softening point temperature of about 112° C., and about 100 grams of poly(1,9-nonenylene-1,12-dodecanoate). To the resins are added about 140 grams of methyl ethyl ketone and about 15 grams of isopropanol. The mixture is stirred at about 350 revolutions per minute (rpm), heated to about 55° C. over about a 30 minute period, and maintained at about 55° C. for about an additional 3 hours, whereby the resin dissolved to obtain a clear solution. To this solution, is then added dropwise about 9 grams of ammonium hydroxide over about a two minute period, and after stirring for about an additional 10 minutes at about 350 rpm, about 600 grams of water was added dropwise at a rate of about 4.3 grams per minute utilizing a pump. After the addition of water, the organic solvent was removed by distillation at about 84° C., and the mixture is then cooled to room temperature (about 20° C. to about 25° C.) to yield about a 35% solids loading of an aqueous emulsion of core-shell nanoparticles with an average size of about 220 nanometers.

Example III

A Toner Comprised of About 5 Percent by Weight of Pigment Blue 15:3, a Core Comprised of About 50 Percent by Weight of the Core-Shell Nanoparticles of Example II, and About 17 Percent by Weight of Amorphous Nanoparticles of Example I, and a Shell Comprised of 28% by Weight of Amorphous Nanoparticles of Example I A 2 liter kettle is charged with about 137 grams of the core-shell emulsion of Example II above, about 46.6 grams of the amorphous emulsion of Example I, about 600 grams of water, about 24.4 grams of Cyan Pigment Blue 15:2 dispersion (17 percent solids available from Sun Chemicals), and about 2.4 grams of DOWFAX® surfactant (about 47.5 percent aqueous solution), and the mixture is stirred at about 100 rpm. To this mixture is then added about 65 grams of about 0.3 N nitric acid solution until a pH of about 3.7 is achieved, following homogenizing at about 2,000 rpm, and following the addition of about 0.2 ppH of aluminum sulfate, the homogenizer speed is increased to about 4,200 rpm at the end of the aluminum sulfate addition, which results in a pH for the mixture of about 3.1. The mixture is then stirred at about 300 rpm with an overhead stirrer and is placed into a heating mantle. The temperature is increased to about 45° C. over a about 30 minute period, during which the particles grow to about 5.8 microns volume average diameter. To the mixture is then added the toner shell component comprised of a mixture of about 76.2 grams of amorphous emulsion of Example I, and about 0.56 grams of DOWFAX® surfactant (about 47.5 percent aqueous solution), and this mixture is adjusted to a pH of about 3.1 using dilute aqueous nitric acid (about 0.3 N). The mixture is then left stirring for about an additional hour, until the aggregate particle grow to about 5.8 microns. A solution comprised of sodium hydroxide in water (about 4 weight percent by weight of NaOH) is added to freeze the size (prevent further growth) until the pH of the mixture is about 6.8. During this addition, the stirrer speed is reduced to about 150 rpm, the mixture is then heated to about 63° C. over about 60 minutes, after which the pH is maintained at about 6.6 to about 6.8 with dropwise addition of an aqueous solution of sodium hydroxide (about 4 weight percent by weight). Subsequently, the mixture is heated to coalescence at a final temperature of about 69° C. and the pH is gradually reduced to about 6.3.

RESULTS

Measurement of Tribocharge and Relative Humidity Sensitivity (RH)

Developer samples are prepared in a 60 milliliter glass bottle by weighing about 0.5 gram of toner onto about 10 grams of carrier comprised of a steel core and a coating of a polymer mixture of polymethylmethacrylate (PMMA, about 60 weight percent) and polyvinylidene fluoride (about 40 weight percent). Developer samples are prepared in duplicate as above for each toner that is evaluated. One sample of the pair is conditioned in the A-zone environment of about 28° C./about 85% RH, and the other is conditioned in the C-zone environment of about 10° C./about 15% RH. The samples are kept in the respective environments overnight, about 18 to about 21 hours, to fully equilibrate. The following day, the developer samples are mixed for about 1 hour using a Turbula mixer, after which the charge on the toner particles is measured using a charge spectrograph. The toner charge is calculated as the midpoint of the toner charge distribution. The charge is in millimeters of displacement from the zero line for both the parent particles and particles with additives. The relative humidity (RH) ratio is calculated as the A-zone charge at about 85% humidity (in millimeters) over the C-zone charge at about 15% humidity (in millimeters). For the toner of Example III, the RH sensitivity can be found to be from about 0.5 to about 0.95.

Fusing Results

Unfused test images are made using a Xerox Corporation DC12 color copier/printer. Images are removed from the Xerox Corporation DC12 before the document passes through the fuser. These unfused test samples are then fused using a Xerox Corporation iGen3® fuser. Test samples are directed through the fuser using the Xerox Corporation iGen3® process conditions (about 100 prints per minute). Fuser roll temperature is varied during the experiments so that gloss and crease area can be determined as a function of the fuser roll temperature. Print gloss is measured using a BYK Gardner 75 degree gloss meter. How well toner adheres to the paper is determined by its crease fix minimum fusing temperature (MFT). The fused image is folded and about an 860 gram weight of toner is rolled across the fold after which the page is unfolded and wiped to remove the fractured toner from the sheet. This sheet is then scanned using an Epson flatbed scanner and the area of toner which had been removed from the paper is determined by image analysis software such as the National Instruments IMAQ. For the toner of Example III, the minimum fixing temperature can be found to be from about 110° C. to about 120° C., the hot-offset temperature can be found to be about equal to or greater than about 210° C., and the fusing latitude can be about equal to or greater than about 80° C. Such properties are desirable for the EA toners described herein.

It will be appreciated that various of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. Core-shell nano-sized particles comprising particles having a core and a shell, wherein the core of the particles comprises crystalline polyester and the shell of the particles comprises amorphous polyester and is substantially to completely free of crystalline material, wherein the shell encapsulates the core, and wherein the nano-sized particles have an average particle size of about 1 nm to about 250 nm.

2. The core-shell nano-sized particles according to claim 1, wherein the nano-sized particles have an average particle size of from about 5 nm to about 150 nm.

3. The core-shell nano-sized particles according to claim 1, wherein the amorphous polyester is a linear polyester.

4. The core-shell nano-sized particles according to claim 1, wherein the amorphous polyester is selected from the group consisting of poly(1,2-propylene-diethylene)terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and mixtures thereof.

5. The core-shell nano-sized particles according to claim 1, wherein the crystalline polyester and amorphous polyester are not miscible.

6. The core-shell nano-sized particles according to claim 1, wherein the core is from about 20 weight percent to about 90 weight percent of the core-shell nano-sized particles.

7. The core-shell nano-sized particles according to claim 1, wherein the shell is from about 10 weight percent to about 80 weight percent of the core-shell nano-sized particles.

8. The core-shell nano-sized particles according to claim 1, wherein the core is all crystalline polyester.

9. Emulsion aggregation toner particles comprising:
a core, wherein the core is aggregated from nanoparticles having a core and a shell, wherein the core of the nanoparticles comprises crystalline polyester and the shell of the nanoparticles comprises amorphous polyester and is substantially to completely free of crystalline material, wherein the shell of the nanoparticles encapsulates the core of the nanoparticles, and wherein the nanoparticles have an average particle size of about 1 nm to about 250 nm; and
a shell that encapsulates the aggregated core, wherein the shell is substantially free of the crystalline material.

10. The emulsion aggregation toner particles according to claim 9, wherein the crystalline polyester and the amorphous polyester are not miscible.

11. The emulsion aggregation toner particles according to claim 9, wherein the nanoparticles have an average particle size of about 1 nm to about 150 nm.

12. The emulsion aggregation toner particles according to claim 9, wherein the aggregated core portion of the emulsion aggregation toner particles further comprises at least one of a colorant, a wax and a charge additive.

13. The emulsion aggregation toner particles according to claim 9, wherein the crystalline polyester of the core of the nanoparticles is encapsulated by the amorphous polyester of the shell of the nanoparticles and further by the shell of the emulsion aggregation toner particles.

14. The emulsion aggregation toner particles according to claim 9, wherein the shell of the emulsion aggregation toner particles comprises amorphous material.

15. The emulsion aggregation toner particles according to claim 9, wherein the emulsion aggregation toner particles have an average particle size of from about 3 μm to about 15 μm, wherein the emulsion aggregation toner particles have a minimum fixing temperature from about 100° C. to about 130° C., and wherein the emulsion aggregation toner particles have a relative humidity sensitivity of from about 0.5 to about 1.0.

16. The emulsion aggregation toner particles according to claim 14, wherein the amorphous material of the shell of the emulsion aggregation toner particles is miscible with at least one of the crystalline polyester of the core of the nanoparticles or the amorphous polyester of the shell of the nanoparticles.

17. The emulsion aggregation toner particles according to claim 9, wherein the nanoparticles comprise from about 30 weight percent to about 100 weight percent of the emulsion aggregation toner particles.

18. The emulsion aggregation toner particles according to claim 9, wherein the shell that encapsulates the aggregated core of the emulsion aggregation toner particles is up to about 70 weight percent of the emulsion aggregation toner particles.

19. An emulsion aggregation toner particle comprising:
a core, wherein the core is aggregated from nanoparticles having a core and a shell, wherein the core of the nanoparticles comprises crystalline polyester and the shell of the nanoparticles comprises amorphous polyester and is substantially to completely free of crystalline material, wherein the shell of the nanoparticles encapsulates the core of the nanoparticles, and wherein the nanoparticles have an average particle size of about 1 nm to about 250 nm;
a first shell that encapsulates the aggregated core forming a primary aggregate, wherein the shell is substantially free of the crystalline material, and
a second shell that encapsulates the primary aggregate.

20. The emulsion aggregation toner particles according to claim 19, wherein the crystalline polyester and the amorphous polyester are not miscible.

21. The emulsion aggregation toner particles according to claim 19, wherein the first shell and the second shell comprise at least an amorphous material.

22. The emulsion aggregation toner particles according to claim 21, wherein the amorphous material of the first shell and the amorphous material of the second shell are the same or different.

23. The emulsion aggregation toner particles according to claim 21, wherein the amorphous material of the first shell and the amorphous material of the second shell are the same or different and is each selected from the group consisting of poly(1,2-propylene-diethylene)terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene-β-carboxyethyl acrylate), poly(styrene-butadiene-acrylonitrile-β-carboxyethyl acrylate), poly(styrene-butyl acrylate-β-carboxyethyl acrylate), poly(styrene-butyl acrylate-acrylonitrile-β-carboxyethyl acrylate), and mixtures thereof.

24. The core-shell nano-sized particles according to claim 5, wherein the crystalline polyester is derived from about 9 carbon atom to about 12 carbon atom diols or from about 10 carbon atom to about 12 carbon atom diacids.

25. The core-shell nano-sized particles according to claim 24, wherein the crystalline polyester is derived from diols selected from the group consisting of poly-(1-9-nonylene-1,12-dodecanoate), poly-(1-10-decylene-1,12-dodecanoate), poly-(1,9-nonylene azaelate), and poly-(1-10-decylene-1,12-dodecanoate).

26. The core-shell nano-sized particles according to claim 24, wherein the amorphous polyester is selected from the group consisting of poly(propoxylated bisphenol co-fumarate) and poly(co-propoxylated bisphenol co-ethoxylated bisphenol fumarate).

27. The core-shell nano-sized particles according to claim 1, wherein the core-shell sized particles are mixed with nano-sized amorphous polyester free of crystalline material.

* * * * *